(12) United States Patent
Vassallo et al.

(10) Patent No.: US 9,794,326 B1
(45) Date of Patent: Oct. 17, 2017

(54) LOG INFORMATION TRANSMISSION INTEGRITY

(71) Applicant: Amazon Technologies, Inc., Reno, NV (US)

(72) Inventors: Daniel Vassallo, Seattle, WA (US); Emmanuel Pierre Devillard, Issaquah, WA (US); Hongqi Wang, Newcastle, WA (US); Muhammad Umer Azad, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 311 days.

(21) Appl. No.: 14/310,854

(22) Filed: Jun. 20, 2014

(51) Int. Cl.
*H04L 29/08* (2006.01)

(52) U.S. Cl.
CPC .................................. *H04L 67/10* (2013.01)

(58) Field of Classification Search
CPC .. G06F 11/3476; G06F 11/1453; G06F 11/34; G06F 17/30156
See application file for complete search history.

(56) References Cited

U.S. PATENT DOCUMENTS

| | | | | |
|---|---|---|---|---|
| 8,074,043 B1* | 12/2011 | Zeis | ................ | G06F 11/1453 711/162 |
| 8,135,918 B1* | 3/2012 | Yueh | ................ | G06F 13/28 711/147 |
| 8,850,263 B1* | 9/2014 | Yourtee | ................ | G06F 11/0709 714/20 |
| 8,892,518 B1* | 11/2014 | Kannan | ................ | G06F 11/0709 707/631 |
| 2009/0248753 A1* | 10/2009 | Tsai | ................ | G06F 11/0709 |
| 2010/0251160 A1* | 9/2010 | Shafi | ................ | G06F 11/328 715/772 |
| 2013/0346980 A1* | 12/2013 | Branch | ................ | G06F 11/3476 718/100 |
| 2015/0178310 A1* | 6/2015 | Fellner | ................ | G06F 3/0673 711/154 |

* cited by examiner

*Primary Examiner* — Joe Chacko
(74) *Attorney, Agent, or Firm* — Baker & Hostetler LLP (57) ABSTRACT

A system for collecting and disseminating log information may comprise a log agent and a log service. A log agent may transmit a log stream to a log service using non-overlapping adjacent subsets of log entries. Each subset may be associated with a unique and monotonically increasing sequence number, which is not incremented until the subset is received and processed by a log service.

20 Claims, 6 Drawing Sheets

LOG INFORMATION TRANSMISSION INTEGRITY

BACKGROUND

Various computing systems may generate large amounts of log data describing various aspects of their operation. Log data may be written to files that are retained for use in analyzing system behavior, particularly those aspects involving system failure. The log files may be of considerable size, presenting various difficulties related to viewing and handling the files. Partly due to these factors, and partly due to the complexity of the information they contain, the information contained in log files may be under-utilized. In particular, hosted services and multi-tenant systems may benefit from increased utilization of log data.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Log information originating from the operation of hosted services and multi-tenant systems may be collected and distributed in real time to a log service. A log service may aid in the dissemination of log information to clients of hosted services or users of multi-tenant systems. In the context of hosted services and multi-tenant systems, near real-time collection of log information may be utilized to distribute information to clients and users in a timely fashion. Typical methods of collecting information from log files—such as copying the files from the originating device to a destination device—may be unwieldy. Furthermore, the users of hosted services and multi-tenant systems may have different operational schedules than the providers of those services. However, various techniques described herein may be employed to improve collection and dissemination of log information.

A system for collection and dissemination of log information may comprise a log agent operating on a host computing node, on which various services are in operation and generating log information. There may be a single log agent per host, one log agent for each service type or various other combinations. For simplicity of explanation, the examples presented herein will generally refer to a single log agent.

A log agent may collect log information from sources on the host computing node and transmit that information to a log service. The log service may then store, analyze or otherwise process the information for use by various clients.

For various reasons, communications networks between a log agent and a log service may be prone to disruption or error. In addition, the computing node on which a log agent runs or the computing node on which a log service runs may be subject to downtime. Because of these and other conditions, the transmission of log information between a log agent and a log server may be prone to error. Embodiments of the present disclosure may, however, employ techniques and mechanisms described herein to reliably disseminate log information under a variety of failure conditions. Embodiments of the present disclosure may, for example, be used to ensure delivery of log information to the log service while still avoiding various failure modes such as duplication of information or loss of information.

Figure 1:
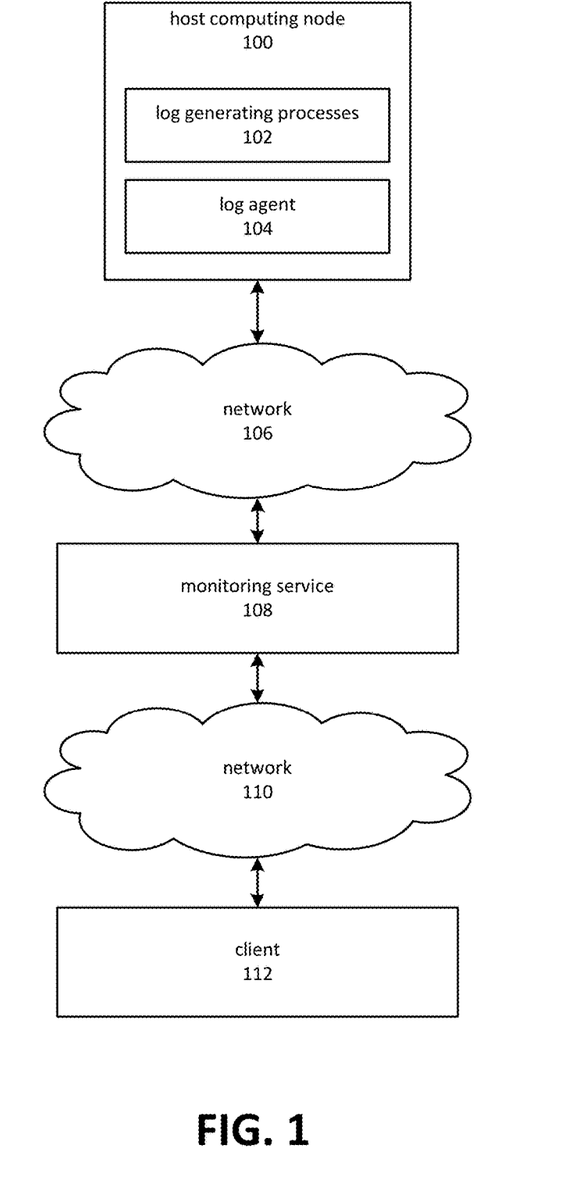
FIG. 1 is a block diagram depicting an embodiment of a system for transmitting log stream information from a source log to a log service while avoiding loss or duplication of data under a wide variety of failure conditions.

FIG. 1 is a block diagram depicting an embodiment of a system for transmitting log stream information from a source log to a log service while avoiding loss or duplication of data under a variety of failure conditions.

A host computing node 100 may operate one or more services such as web servers, web services, business objects, databases and so forth. These services, as well as components such as the operating system of host computing node 100, may produce log information. They are depicted in FIG. 1 as log generating processes 102. The log information may comprise various entries which may in some cases be appended to the end of a log file or other structure. In some embodiments, a protocol may be defined allowing for log information to be provided directly to a consumer of the data.

One or more log generating processes 102 may generate log information related to various events occurring on host computing node 100, or elsewhere. A client 112 may utilize network 110 to access log information stored by a monitoring service 108, which may provide various features related to processing log information. A client 112 may utilize monitoring service 108 to obtain insight into various conditions, such as errors, that may be occurring on host computing node 100.

One or more log generating processes 102 may generate log information and store the information on a storage device coupled to host computing node 100. A log agent 104 may obtain log information from sources such as the storage devices coupled to host computing node 100. A protocol or API may also be employed to allow for a service operating on the host computing node to submit data directly to log agent 104. There may be a plurality of sources involved. A log agent 104 may transmit the log information it collects as a log stream, which may be defined as an ordered sequence of log entries over one or more of the plurality of sources. Various sort orders, such as time and date, may be used. The term "log stream" may be used to refer to any sequence of log entries, regardless of any structures, such as log files, used to contain them.

A log agent 104 may transmit log information from host computing node 100 to monitoring service 108 over network 106. There may, however, be a variety of conditions which may cause omission, delay, duplication or other issues with respect to the transmitted log information. Examples include failure to transmit log information (i.e. omission of data) and duplication of data. These issues may be encountered in the context of a continuous log stream, as opposed to non-continuous mechanisms for distributing log information, such as transmitting log files between computing devices. Transmission of continuously generated log information may require mechanisms for sharing the log information that are more advanced than (for example) transmitting log files in their entirety. Accordingly, mechanisms described herein may be employed for the robust transmission of log information.

Figure 2:
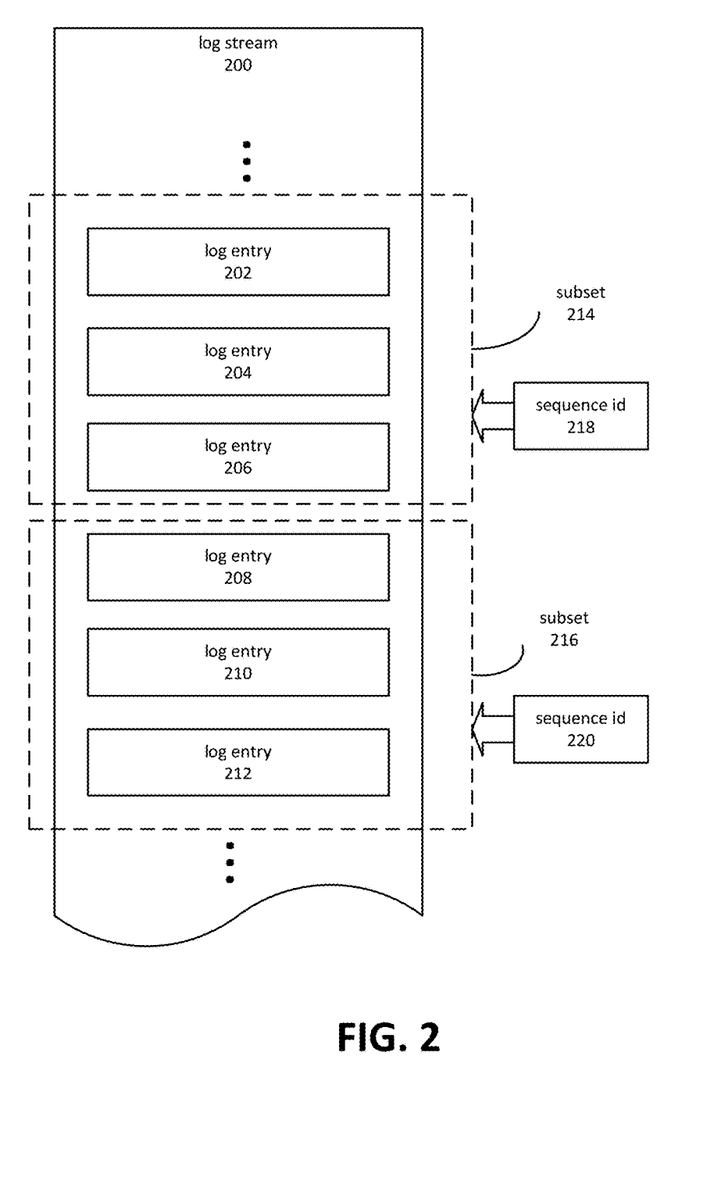
FIG. 2 is a block diagram depicting a method of identifying portions of a log stream for association with a sequence id.

FIG. 2 is a block diagram depicting a method of identifying portions of a log stream 200 for association with a sequence id. As noted, a log stream 200 may be a sequence of log entries arranged in a defined order. In various embodiments, the sequence is time ordered so that the most recent log entries are last in the log stream. Log entries 202-212 may, for illustrative purposes, be assumed to belong to log stream 200 based on an ordering such as time.

A technique for transmitting log entries 202 from a log agent to a log service may employ techniques of the present disclosure in order to minimize or eliminate the possibility of errors such as duplication from occurring during transmission. The techniques disclosed herein may reduce or eliminate the possibility of duplicate log entries being processed by a log service under conditions such as a power outage occurring on a host computing device after a log entry has been transmitted but before it has been successfully processed.

Portions of a log stream 200 may be identified for transmission, as a unit, from a host computing node to a log service. For example, in FIG. 2 log entries 202, 204, and 206 may be associated with subset 214 and log entries 208, 210, and 212 may be associated with subset 216. Each subset may also be associated with an identifier. For example, in FIG. 2 subset 214 is depicted as being associated with sequence id 218, and subset 216 is depicted as being associated with sequence id 220.

Figure 3:
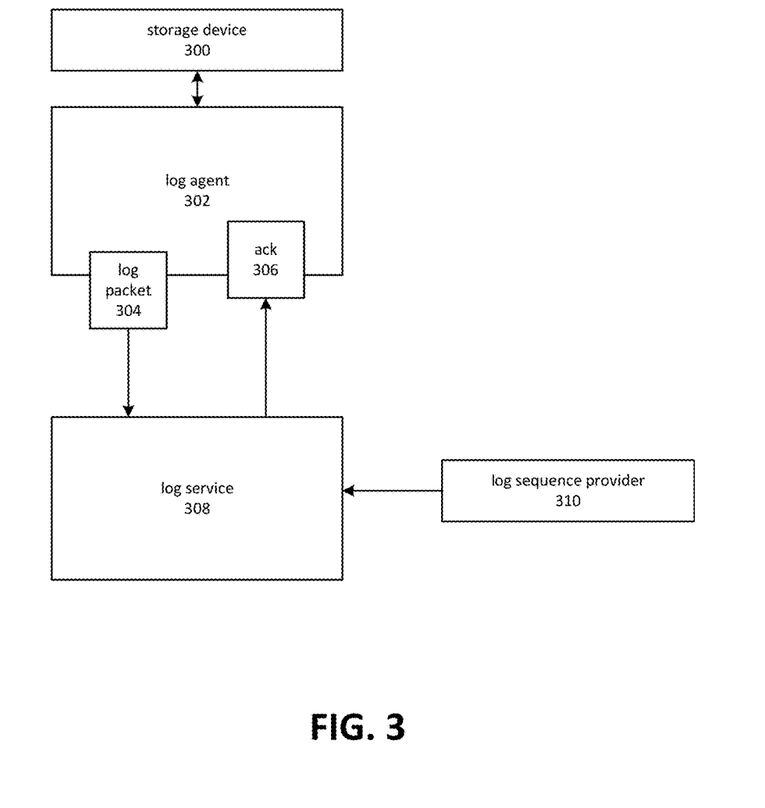
FIG. 3 is a block diagram depicting a system utilizing log sequence identifiers for transmitting log information over a network.

In order to more reliably transmit data between a host computing node and a log service, embodiments may employ techniques involving associating identifiers with subsets of the log stream. FIG. 3 is a block diagram depicting a system utilizing log sequence identifiers for transmitting log information over a network.

A log agent 302 may collect log information from various sources on a host computing node. In some embodiments, the source information may be ordered, for example by time. A log agent 302 may select successive non-overlapping subsets of log entries from a log stream. The source data that may comprise the log stream may reside on storage device 300. It may, for example, be stored within one or more log files maintained within a file system on storage device 300.

A log packet 304 may be formed for transmission from a log agent 302 to a log service 308. A log packet 304 may comprise log entries for a subset of the log stream, as well as a log sequence identifier corresponding to the subset. Log agent 302 may store log packet 304 to storage device 300 prior to transmitting log packet 304 to log service 308. In various embodiments, additional information may also be stored with log packet 304, and may or may not be transmitted with log packet 304. This information may include indices, pointers and the like for purposes such as maintaining continuity between subsets of log entries.

Log service 308 may process log packet 304 upon receiving it. Once the data has been successfully processed, log service 308 may communicate with a log sequence provider 310 and request that a new log sequence identifier be generated. The log sequence identifier may, in some embodiments, be monotonically increasing. In other embodiments, the log sequence identifier may not be monotonically increasing. For example, a log sequence identifier might be a random non-repeating sequence of alphanumeric characters. Information may be embedded in the identifier. Some embodiments may obfuscate the value. Log sequence provider 310 may maintain, on a storage device, a record of the last sequence number it generated. Alternatively, in some embodiments the current log sequence identifier may be passed to log sequence provider 310, which may then generate the next log sequence based on the current value.

A log service 308 may, after processing log packet 304 and obtaining a new log sequence identifier from log sequence provider 310, send an ack 306 to log agent 302. An ack 306 may contain the next sequence number obtained by log service 308 from log sequence provider 310.

Upon receipt of ack 306, log agent 302 may free the stored record of the subset of log entries and the log sequence number. It may then identify a second subset of records from the log stream (subsequent to and non-overlapping to the first subset) and store an additional record comprising the second subset of log entries and the new log sequence identifier.

In some cases, it may be that log packet 304 will get lost in transmission. Log agent 302 may resend log packet 304 on a periodic basis until ack 306 is received. In various embodiments, log agent 302 will not send additional log packets, for records subsequent to those in log packet 304, until ack 306 is received.

It may also be the case that log service 308 may receive multiple copies of log packet 304. In such cases, log service 308 may compare the log sequence identifier included in log packet 304 to a current log sequence identifier, which may be retrieved from log sequence provider 310 or obtained through other means, such as from a storage device coupled to log service 308. If the log sequence identifier for received log packet 304 is less than the current log sequence number, embodiments may determine that the data in the log packet has already been processed. Embodiments may, in response, send an additional acknowledgement message to log agent 302.

Figure 4:
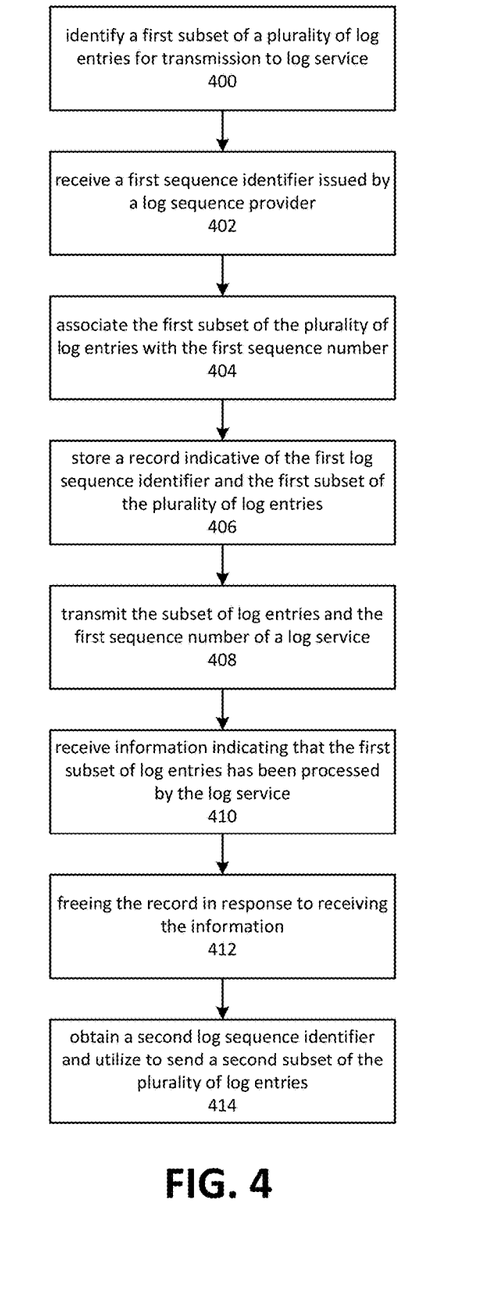
FIG. 4 is a flowchart depicting an embodiment of a process for reliable transmission of log stream information.

FIG. 4 is a flowchart depicting an embodiment of a process for reliable transmission of log stream information. Although depicted as a sequence of operations, those of ordinary skill in the art will appreciate that the depicted order should not be construed as limiting the scope of the present disclosure and that at least some of the depicted operations may be altered, omitted, reordered, supplemented with additional operations or performed in parallel. Embodiments of the depicted process may be implemented using various combinations of computer-executable instructions executed by a computing system, such as the computing systems described herein.

Operation 400 depicts identifying a first subset of a plurality of log entries for transmission to a log service. The subset of log entries may be selected from a log stream based on ordering of the log stream and on previous subsets. A previous subset may be identified based on retrieving a persisted log packet from a storage device, or by other techniques. The subsets may be adjacent but not overlapping, so that adjacent subsets do not contain duplicate log entries.

Operation 402 depicts receiving a first sequence number issued by a log sequence provider. As depicted in FIG. 3, the sequence number may have been previously transmitted to a log agent from a log service in an acknowledgement message. The log sequence identifier may be monotonically increasing relative to previous sequence numbers. Note, however, that some embodiments may obfuscate or encrypt the sequence number in a manner that also obscures its monotonic properties. These embodiments may perform de-obfuscation or de-encryption on the log sequence number. Other embodiments may use identifiers that do not increase monotonically. In various embodiments, an initial log sequence identifier may be generated based on a constant initial value, such as the value '0.' Subsequent log sequence identifiers may be provided by a log sequence provider and included in an acknowledgement message. In various embodiments, a separate sequence of log sequence identifiers may be provided for each log stream being transmitted from a log agent to a log service.

Operation 404 depicts associating the first subset of the plurality of log entries with the first log sequence identifier. This may be done in a variety of ways, and may be integrated with other operations, such as operation 406. Association between a log sequence number and a subset of log entries may be maintained so that embodiments may resend a packet of log entries associated with the current log sequence number. Embodiments may, however, maintain the association for the current subset of entries but not for prior subsets.

Operation 406 depicts storing a record that comprises the first log sequence identifier and the first subset of log entries from the log stream. In some embodiments, the record may include the log sequence identifier and a reference to the first subset. Either of these approaches, and additional approaches, may be employed to enable resending of a log packet in the event of system failure or for any other reason.

Operation 408 depicts transmitting the first subset of log entries and the log sequence identifier from a log agent on a host device to a log service on another computing node. The log entries and the log sequence identifier may be sent as a log packet, so that both may be received at the same time by the log service.

Operation 410 depicts receiving information indicating that the first subset of log entries has been processed by the log service. The information may also comprise a second log sequence number. The second log sequence number may be adjacent in order to the first log sequence identifier, and may be monotonically increased with respect to the first log sequence identifier and additional previous log sequence identifiers.

Operation 412 depicts freeing the record in response to receiving the information that indicates that the first subset of log entries has been successfully processed. In some embodiments, the record may be deleted, marked as complete or reused. The record may, for example, be reused to store a second subset of the plurality of log entries and a second log sequence identifier.

Operation 414 depicts obtaining a second log sequence identifier and utilizing it to send a log packet comprising a second subset of the plurality of log entries and the second log sequence identifier. Embodiments may obtain the log sequence identifier from the log service, which may have included the identifier in an acknowledgement message indicating that the previous set of log entries has been successfully processed, as depicted in operation 410.

In various embodiments, the techniques described herein may be employed to provide a natural throttling mechanism for communications between a log agent and a log service. It may be the case that, if a large amount of log data is generated on the host, an unthrottled delivery of data to the log service may cause the log service to be overwhelmed, which may in turn lead to a loss of information, system downtime and so forth.

As may be seen in FIG. 4, in various embodiments a log agent may obtain the next log sequence identifier in an acknowledgement sent from a log service. Because of this, and because the log agent will not, in various embodiments, send a log packet without first obtaining a log sequence identifier, the rate at which log packets are sent will be approximately equal to the rate at which the log packets may be processed by the log service.

Embodiments may employ adjustments to the size of log packets in order to tune communications between a log agent and a log service. For example, log packet size may be increased if the log service appears to be underutilized, while log packet size may be decreased if the log service appears to be over-utilized. Another factor that may be considered is maximum wait time, such as the maximum length of time that should elapse between the origination of a log entry and its dissemination to a log service. Larger packet sizes may be associated with increased delay, for example due to a delay in collecting enough data to fill a larger packet size.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices such as solid-state drives.

Figure 5:
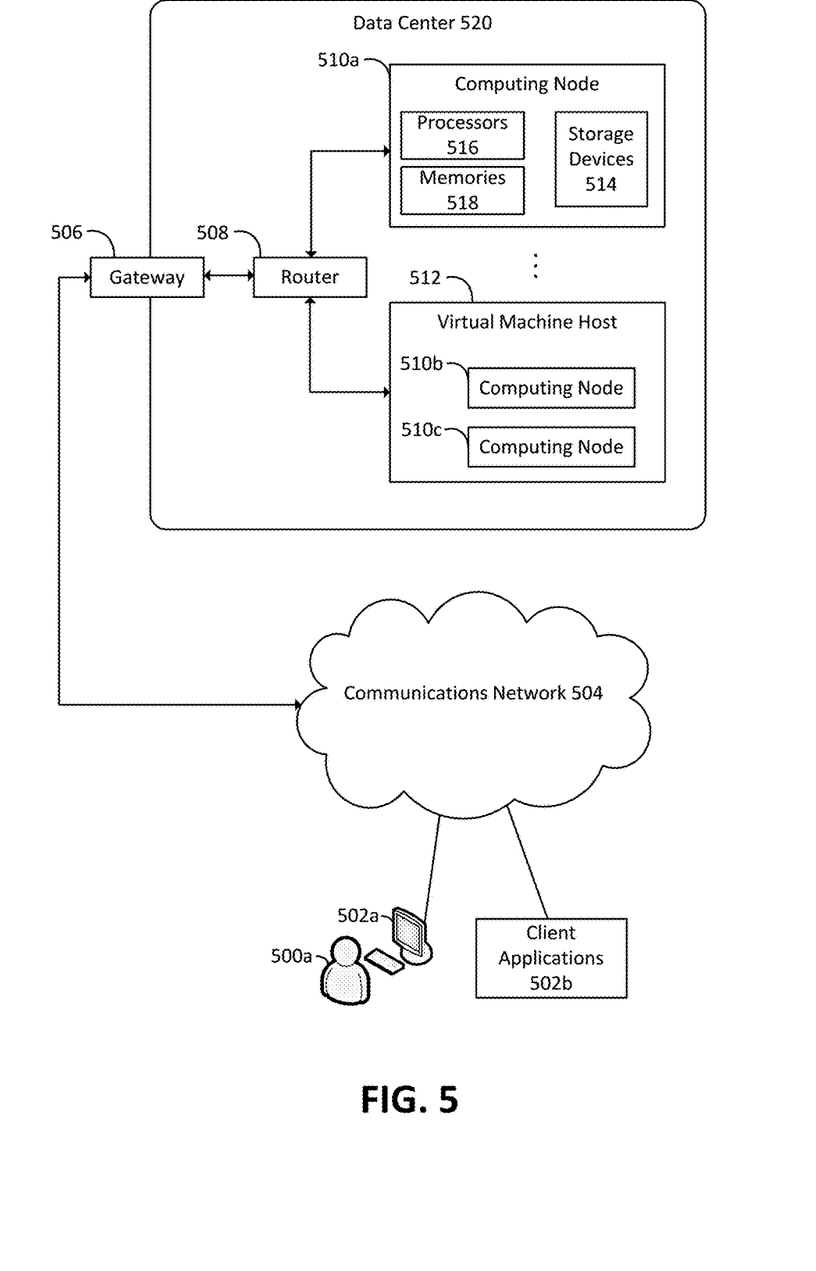
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b and 510c within a data center 520. Alternatively, client applications 502b may communicate without user intervention. Communications network 504 may comprise any combination of communications technology, including the Internet, wired and wireless local area networks, fiber optic networks, satellite communications and so forth. Any number of networking protocols may be employed.

Communication with processes executing on the computing nodes 510a, 510b and 510c, operating within data center 520, may be provided via gateway 506 and router 508. Numerous other network configurations may also be employed. Although not explicitly depicted in FIG. 5, various authentication mechanisms, web service layers, business objects or other intermediate layers may be provided to mediate communication with the processes executing on computing nodes 510a, 510b and 510c. Some of these intermediate layers may themselves comprise processes executing on one or more of the computing nodes. Computing nodes 510a, 510b and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510*a* is depicted as residing on physical hardware comprising one or more processors 516, one or more memories 518 and one or more storage devices 514. Processes on computing node 510*a* may execute in conjunction with an operating system or alternatively may execute as a bare-metal process that directly interacts with physical resources, such as processors 516, memories 518 or storage devices 514.

Computing nodes 510*b* and 510*c* are depicted as operating on virtual machine host 512, which may provide shared access to various physical resources, such as physical processors, memory and storage devices. Any number of virtualization mechanisms might be employed to host the computing nodes.

The various computing nodes depicted in FIG. 5 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
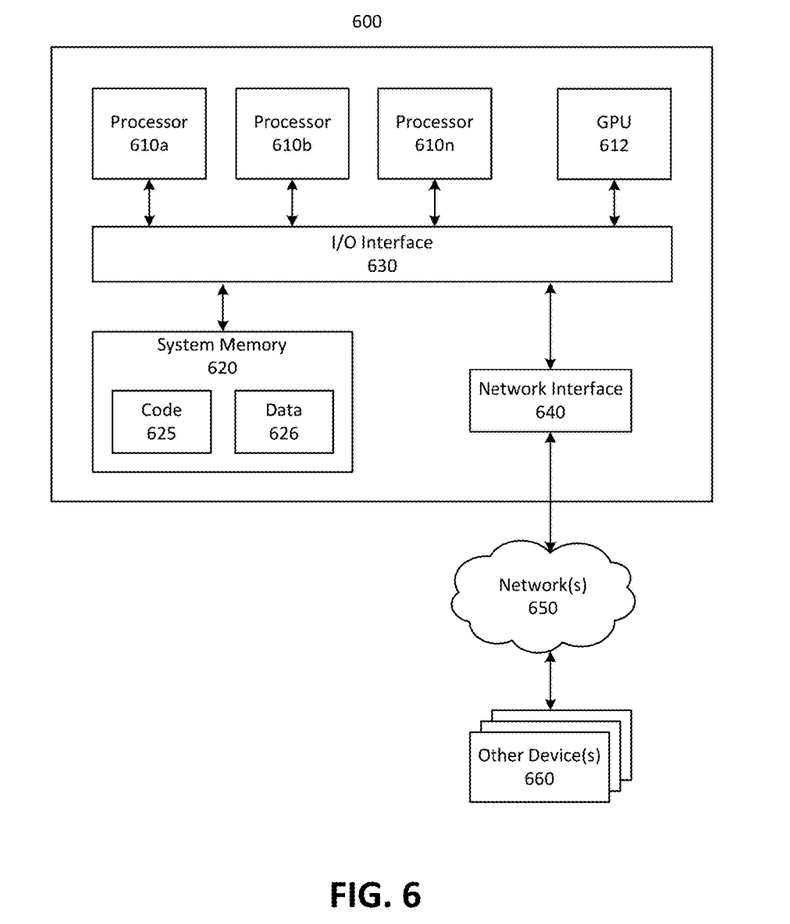
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610*a*, 610*b* and/or 610*n* (which may be referred herein singularly as a processor 610 or in the plural as the processors 610) coupled to a system memory 620 via an input/output (I/O) interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC or MIPS ISAs or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 620 as code 625 and data 626.

In one embodiment, I/O interface 630 may be configured to coordinate I/O traffic between processor 610, system memory 620 and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for transmitting log information, the system comprising:
    a first one or more computing nodes operating a first one or more services, the first one or more services generating a log data stream comprising a plurality of log entries, the first one or more computing nodes communicatively coupled to a storage device;
    a second one or more computing nodes operating a service for processing the log data stream;
    one or more memories having stored thereon computer readable instructions that, upon execution by a computing device, cause the system at least to:
        identify a first subset of the plurality of log entries for transmitting from the first one or more computing nodes to the second one or more computing nodes;
        receive a first identifier issued by a log sequence provider;
        store, on the storage device communicatively coupled to the first one or more computing nodes, a record comprising information indicative of the first subset of the plurality of log entries and the first identifier;
        transmit the first subset of the plurality of log entries and the first identifier to the second one or more computing nodes;
        receive information from the second one or more computing nodes, the received information indicative of the first subset of the plurality of log entries having been processed by the second one or more computing nodes, the information further comprising a second identifier unique with respect to previous identifiers, including the first identifier; and
        in response to receiving the information, freeing the record from the storage device and associating a second subset of the plurality of log entries with the second identifier.

2. The system of claim 1, further comprising one or more memories having stored thereon computer readable instructions that, upon execution by the one or more computing devices, cause the system at least to:
  repeat transmission of the first subset of the plurality of log entries and the first identifier, based at least in part on retrieving the record from the storage device subsequent to recovering from a system failure.

3. The system of claim 1, further comprising one or more memories having stored thereon computer readable instructions that, upon execution by the one or more computing devices, cause the system at least to:
  generate the first identifier based at least in part on a constant initial value.

4. The system of claim 1, wherein the plurality of log entries corresponds to a real-time stream of log information.

5. The system of claim 1, wherein the second identifier is monotonically increased with respect to previous identifiers.

6. The system of claim 1, wherein a number of entries in the plurality of entries is based at least in part on a maximum rate at which the first computing node processes log entries.

7. A system comprising:
  one or more computing nodes including a log agent for collecting and transmitting log entries;
  one or more memories having stored thereon computer readable instructions implementing a log service that, upon execution by a computing device, cause the system at least to:
    receive a first subset of a plurality of log entries maintained on the one or more computing nodes and a first identifier associated with the first subset of the plurality of log entries, wherein the first identifier was issued by a log sequence provider;
    process the first subset of the plurality of log entries;
    transmit, to the log sequence provider, a request to generate a second identifier that is different from previous identifiers of the log sequence provider; and
    transmit information indicative of completed processing of the first subset of the plurality of log entries, the information comprising the second identifier.

8. The system of claim 7, further comprising one or more memories having stored thereon computer readable instructions that, upon execution by the one or more computing devices, cause the system at least to:
  receive an additional transmission of the first subset of the plurality of log entries and the first identifier upon the one or more computing nodes recovering from a system failure.

9. The system of claim 7, wherein the first identifier and the second identifier are associated with a first sequence of identifiers separate from a second sequence of identifiers, the second sequence of identifiers associated with transmitting a second plurality of log entries.

10. The system of claim 7, wherein processing the first subset of the plurality of log entries includes determining, based at least in part on the first identifier, that the first subset of the plurality of log entries has already been received.

11. The system of claim 7, further comprising one or more memories having stored thereon computer readable instructions that, upon execution by the one or more computing devices, cause the system at least to:
  receive an additional subset of the plurality of log entries and an additional identifier; and
  determine to not process the additional subset of the plurality of log entries based at least in part on the additional identifier being less than the first identifier.

12. The system of claim 7, wherein the log agent receives the information indicative of completed processing of the first subset of the plurality of log entries before sending a second plurality of log entries.

13. A computer-implemented method for processing log information from hosted computing services, the method comprising:
  receiving, from a log agent running on a computer system, information indicative of a first subset of a plurality of log entries and a first identifier, wherein the first subset of the plurality of entries and the first identifier were stored on a storage device of the computer system;
  processing the first subset of the plurality of log entries; and
  obtaining a second identifier that is different from previous identifiers including the first identifier; and
  transmitting, to the log agent, information indicative of completed processing of the first subset of the plurality of entries, the information comprising the second identifier, wherein the log agent, in response to the transmitting, frees the first subset of the plurality of entries and the first identifier from being stored on the storage device of the computer system and associates a second subset of the plurality of log entries with the second identifier.

14. The computer-implemented method of claim 13, wherein the first identifier and the second identifier are associated with a first sequence of identifiers separate from a second sequence of identifiers, the second sequence of identifiers associated with transmitting a second plurality of log entries.

15. The computer-implemented method of claim 13, wherein the information causes the log agent to store the second subset of the plurality of log entries in association with the second identifier on the storage device.

16. The computer-implemented method of claim 13, further comprising:
  receiving an additional transmission of the first subset of the plurality of log entries and the first identifier subsequent to recovering from a system failure.

17. The computer-implemented method of claim 13, wherein the second identifier is monotonically increased with respect to previous identifiers, including the first identifier.

18. The computer-implemented method of claim 13, further comprising:
  adjusting a number of entries in the first subset based on a maximum rate at which entries may be received.

19. The computer-implemented method of claim 13, wherein obtaining the second identifier further comprises:
  determining that the first subset of the plurality of log entries has been successfully processed; and
  retrieving a value for the second identifier based at least in part on transmitting a request to a log sequence provider to retrieve an identifier.

20. The computer-implemented method of claim 13, wherein processing the first subset of the plurality of log entries comprises determining, based at least in part on the first identifier, if the first subset of the plurality of log entries has already been received.

* * * * *